US010970587B2

(12) United States Patent
Kim et al.

(10) Patent No.: US 10,970,587 B2
(45) Date of Patent: Apr. 6, 2021

(54) ELECTRONIC DEVICE FOR NOTIFYING OF UPDATE OF IMAGE SIGNAL PROCESSING AND METHOD FOR OPERATING THE SAME

(71) Applicant: SAMSUNG ELECTRONICS CO., LTD., Suwon-si (KR)

(72) Inventors: Youngjo Kim, Suwon-si (KR); Sungjun Lim, Suwon-si (KR); Hyunhee Park, Suwon-si (KR); Hongseok Yang, Suwon-si (KR); Changsu Han, Suwon-si (KR); Kwangtai Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 89 days.

(21) Appl. No.: 16/359,293

(22) Filed: Mar. 20, 2019

(65) Prior Publication Data

US 2019/0294913 A1 Sep. 26, 2019

(30) Foreign Application Priority Data

Mar. 20, 2018 (KR) .................. 10-2018-0032130

(51) Int. Cl.
*G06K 9/46* (2006.01)
*G06T 7/00* (2017.01)
(Continued)

(52) U.S. Cl.
CPC ......... *G06K 9/4609* (2013.01); *G06K 9/6202* (2013.01); *G06T 7/97* (2017.01);
(Continued)

(58) Field of Classification Search
CPC ...... G06K 9/4609; G06K 9/6202; G06T 7/97; H04N 5/2628; H04N 5/232939
See application file for complete search history.

(56) References Cited

U.S. PATENT DOCUMENTS

2004/0093432 A1 5/2004 Luo et al.
2004/0179228 A1 9/2004 McCluskey et al.
(Continued)

FOREIGN PATENT DOCUMENTS

KR 10-1411912 6/2014
KR 10-1595258 2/2016
KR 10-2019-0040416 4/2019

OTHER PUBLICATIONS

Extended European Search Report and Search Opinion dated Jul. 29, 2019, issued in European Application No. 19164099.4.
(Continued)

*Primary Examiner* — Ruiping Li
(74) *Attorney, Agent, or Firm* — Nixon & Vanderhye P.C.

(57) ABSTRACT

An electronic device is disclosed. The electronic device according to various embodiments includes a display, a memory, a communication module comprising communication circuitry, and a processor, wherein the processor is configured to control the communication module to receive a second image corresponding to a first image stored in the memory from an external electronic device, the second image being an image in which a raw image corresponding to the first image is corrected, to control the display to display the first image on a first segment of the display and to display the second image on a second segment of the display, and to identify whether to store the second image in the memory, based on an input for the first image or the second image.

15 Claims, 13 Drawing Sheets

(51) Int. Cl.
     *H04N 5/232*      (2006.01)
     *G06K 9/62*      (2006.01)
     *H04N 5/262*      (2006.01)
     *H04N 21/234*      (2011.01)
     *H04N 21/4223*      (2011.01)
     *H04N 21/658*      (2011.01)

(52) U.S. Cl.
     CPC ..... *H04N 5/232939* (2018.08); *H04N 5/2628* (2013.01); *H04N 21/234* (2013.01); *H04N 21/4223* (2013.01); *H04N 21/6582* (2013.01)

(56) References Cited

U.S. PATENT DOCUMENTS

| | | | |
|---|---|---|---|
| 2006/0268357 A1* | 11/2006 | Vook | H04N 1/00244 358/448 |
| 2008/0084570 A1* | 4/2008 | Cho | H04N 1/6011 358/1.9 |
| 2010/0195929 A1 | 8/2010 | Inoue | |
| 2010/0277635 A1 | 11/2010 | Kim | |
| 2016/0104284 A1 | 4/2016 | Maguire et al. | |
| 2017/0287127 A1* | 10/2017 | Chung | G06T 11/60 |
| 2019/0110077 A1 | 4/2019 | Kim et al. | |

OTHER PUBLICATIONS

Search Report and Written Opinion dated Jun. 25, 2019 in counterpart International Patent Application No. PCT/KR2019/003259.

* cited by examiner

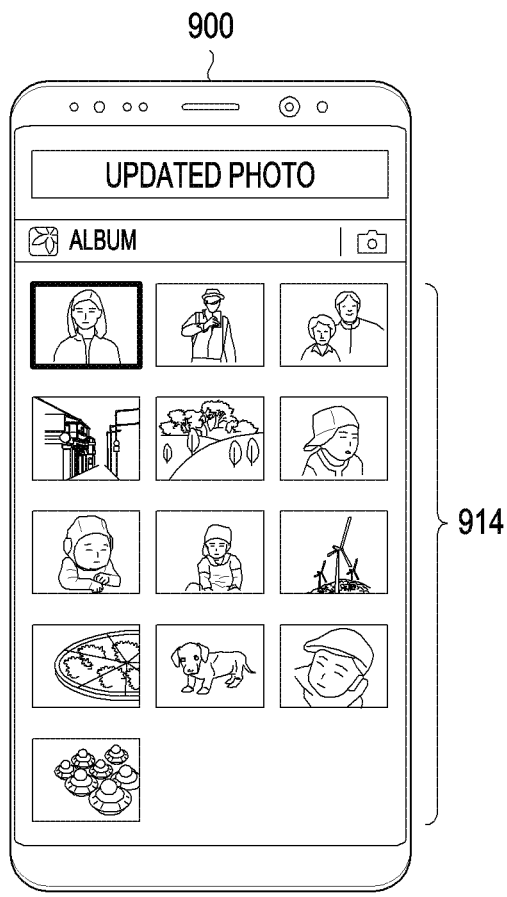
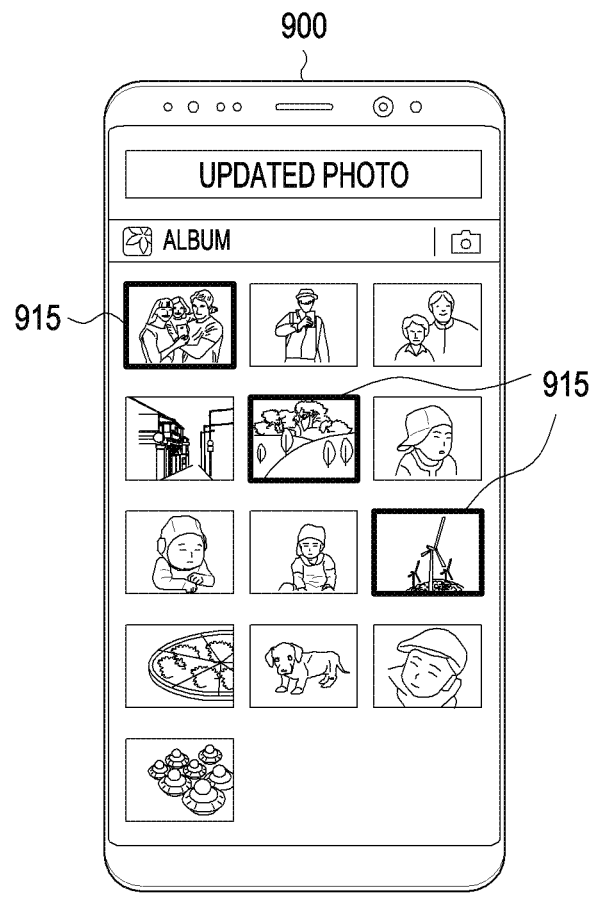
FIG.9C                    FIG.9D

ELECTRONIC DEVICE FOR NOTIFYING OF UPDATE OF IMAGE SIGNAL PROCESSING AND METHOD FOR OPERATING THE SAME

CROSS-REFERENCE TO RELATED APPLICATION

This application is based on and claims priority under 35 U.S.C. § 119 to Korean Patent Application Serial No. 10-2018-0032130, filed on Mar. 20, 2018, in the Korean Intellectual Property Office, the disclosure of which is incorporated by reference herein in its entirety.

TECHNICAL FIELD

The disclosure relates to an electronic device for notifying of an update of image signal processing (ISP) through a display, and a method for operating the same.

BACKGROUND

Description of Related Art

Services are provided by image processing cloud systems to create image backups and new media content. When an electronic device transmits a plurality of images acquired using an image sensor to a cloud system, the cloud system may transmit images, which correspond to the plurality of images and are corrected by image signal processing (ISP) of the cloud system, to the electronic device.

When the ISP is updated, a plurality of images stored in the storage of the cloud system may be corrected using the updated ISP, and the corrected plurality of images may be transmitted to the electronic device.

In the case in which the cloud system corrects all of the plurality of images stored in the storage according to the ISP update and transmits the corrected plurality of images to the electronic device, a large load may be consumed in the cloud system. In addition, when the electronic device displays all of the received plurality of images on a display, it may be difficult to identify contents in which the plurality of images are corrected.

SUMMARY

According to various example embodiments, a cloud system may perform correction on at least one image that meets a condition from among a plurality of stored images in order to reduce the load on the cloud system, and an electronic device may display images together before and after the correction, thereby clearly displaying the corrected contents.

In accordance with an example aspect of the present disclosure, an electronic device is provided, the electronic device including: a display; a memory; a communication module comprising communication circuitry; and a processor, wherein the processor is configured to control the electronic device to: receive a second image corresponding to a first image stored in the memory from an external electronic device using the communication module, the second image being an image in which a raw image corresponding to the first image is corrected, display the first image on a first segment of the display using the display and display the second image on a second segment of the display, and determine whether to store the second image in the memory based on an input for the first image or the second image.

In accordance with another example aspect of the present disclosure, a method of controlling an electronic device is provided, the method of controlling an electronic device according to various example embodiments, including: receiving, from an external electronic device, a second image in which a raw image corresponding to a first image stored in a memory is corrected, the second image corresponding to the first image; displaying the first image on a first segment of a display and displaying the second image on a second segment of the display; and determining whether to store the second image in the memory based on an input for the first image or the second image.

In accordance with yet another example aspect of the present disclosure, an electronic device is provided, the electronic device according to various example embodiments, including: a communication module comprising communication circuitry; an image signal processing processor; and a processor, wherein the processor is configured to control the electronic device to: receive, from an external electronic device, a plurality of raw images corresponding a first plurality of images included in a memory of the external electronic device using the communication module, identify information associated with at least one stat of the plurality of raw images corresponding to the image signal processing processor, select at least one raw image of the plurality of raw images using the information associated with the at least one stat, generate at least one second image by correcting the at least one raw image, and transmit the at least one second image to the external electronic device.

As described above, an electronic device according to various example embodiments of the present disclosure may display, when the ISP is updated, images corrected by the ISP update together with images before the correction, thereby visually displaying the improvement owing to the correction to a user.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIGS. 9A, 9B, 9C and 9D are diagrams illustrating an example in which an electronic device selects and stores a corrected image according to various embodiments;

DETAILED DESCRIPTION

Figure 1:
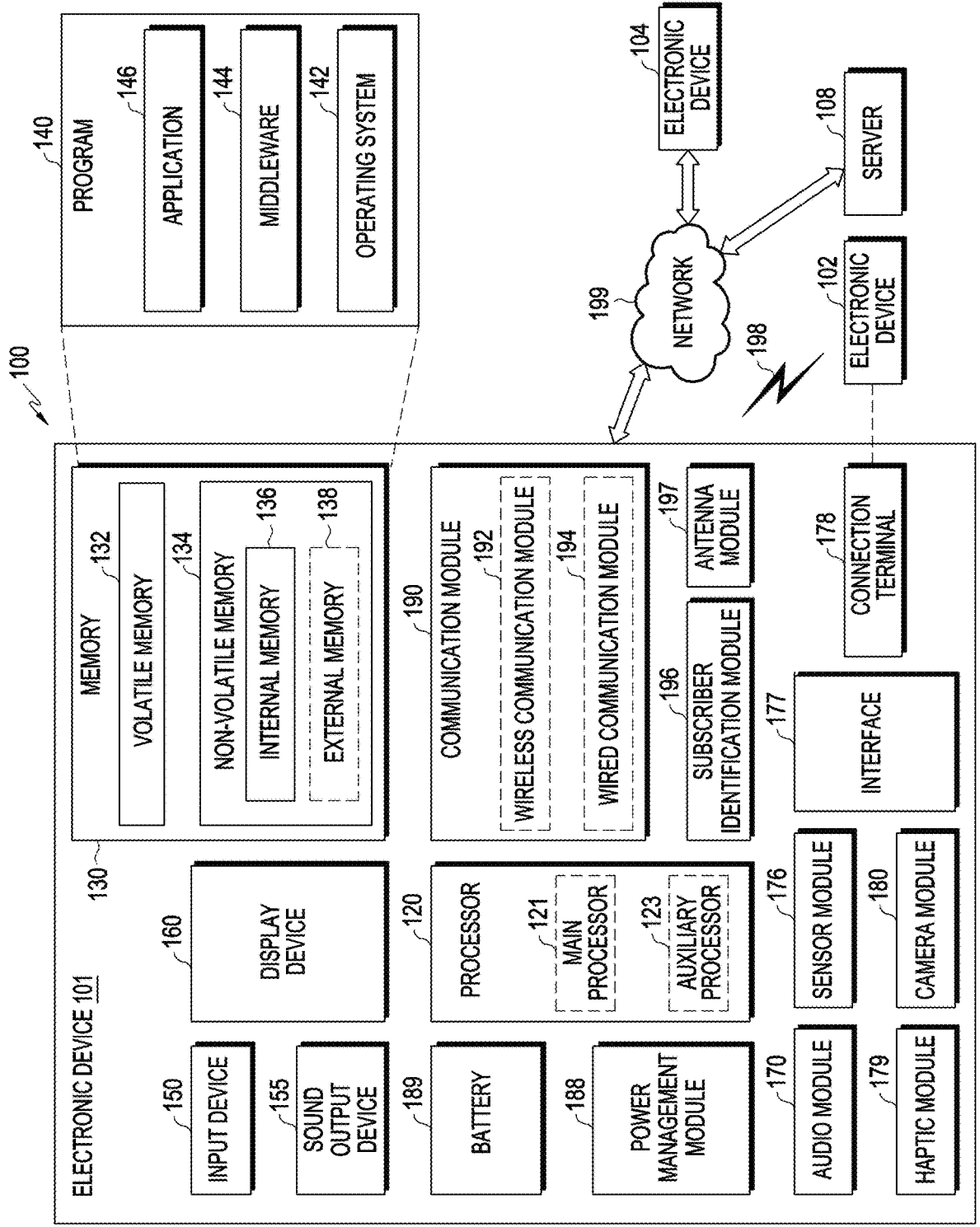
FIG. 1 is a diagram illustrating an example electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
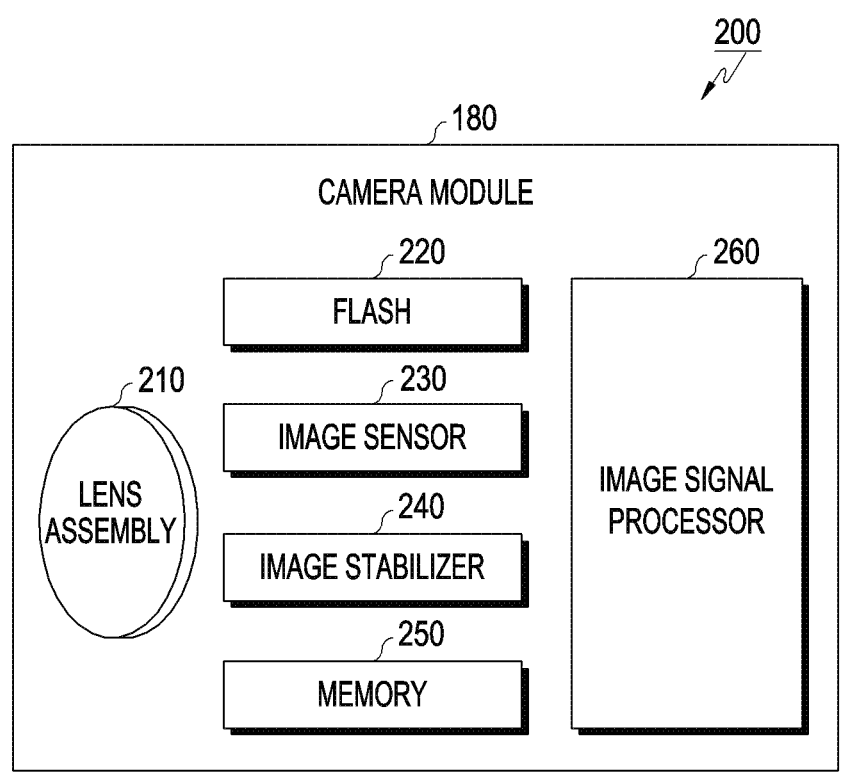
FIG. 2 is a block diagram illustrating an example camera module according to various embodiments.

FIG. 2 is a block diagram 200 illustrating an example of the camera module 180 according to various embodiments. Referring to FIG. 2, the camera module 180 may include a lens assembly 210, a flash 220, an image sensor 230, an image stabilizer 240, memory 250 (e.g., buffer memory), and/or an image signal processor (e.g., including image signal processing circuitry) 260.

The lens assembly 210 may collect light emitted or reflected from an object whose image is to be taken. The lens assembly 210 may include one or more lenses. According to an embodiment, the camera module 180 may include a plurality of lens assemblies 210. In such an example, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include, for example, and without limitation, one or more light emitting diodes (LEDs) (e.g., a red-green-blue (RGB) LED, a white LED, an infrared (IR) LED, an ultraviolet (UV) LED), a xenon lamp, or the like.

The image sensor 230 may obtain an image corresponding to an object by converting light emitted or reflected from the object and transmitted via the lens assembly 210 into an electrical signal. According to an embodiment, the image sensor 230 may include, for example, and without limitation, at least one selected from image sensors having different attributes, such as, for example, and without limitation, an RGB sensor, a black-and-white (BW) sensor, an IR sensor, a UV sensor, a plurality of image sensors having the same attribute, a plurality of image sensors having different attributes, or the like. Each image sensor included in the image sensor 230 may be implemented using, for example, and without limitation, a charged coupled device (CCD) sensor, a complementary metal oxide semiconductor (CMOS) sensor, or the like.

The image stabilizer 240 may include various stabilizing circuitry and move the image sensor 230 and/or at least one lens included in the lens assembly 210 in a particular direction, and/or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using, for example, and without limitation, a gyro sensor (not shown), an acceleration sensor (not shown), or the like, disposed inside or outside the camera module 180. According to an embodiment, the image stabilizer 240 may be implemented, for example, and without limitation, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, based on a specified condition being met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may include various image signal processing circuitry and perform one or more image processing with respect to an image obtained via the image sensor 230 or an image stored in the memory 250. The one or more image processing may include, for example, and without limitation, depth map generation, three-dimensional (3D) modeling, panorama generation, feature point extraction, image synthesizing, image compensation (e.g., noise reduction, resolution adjustment, brightness adjustment, blurring, sharpening, or softening), or the like. The image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In such an example, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3:
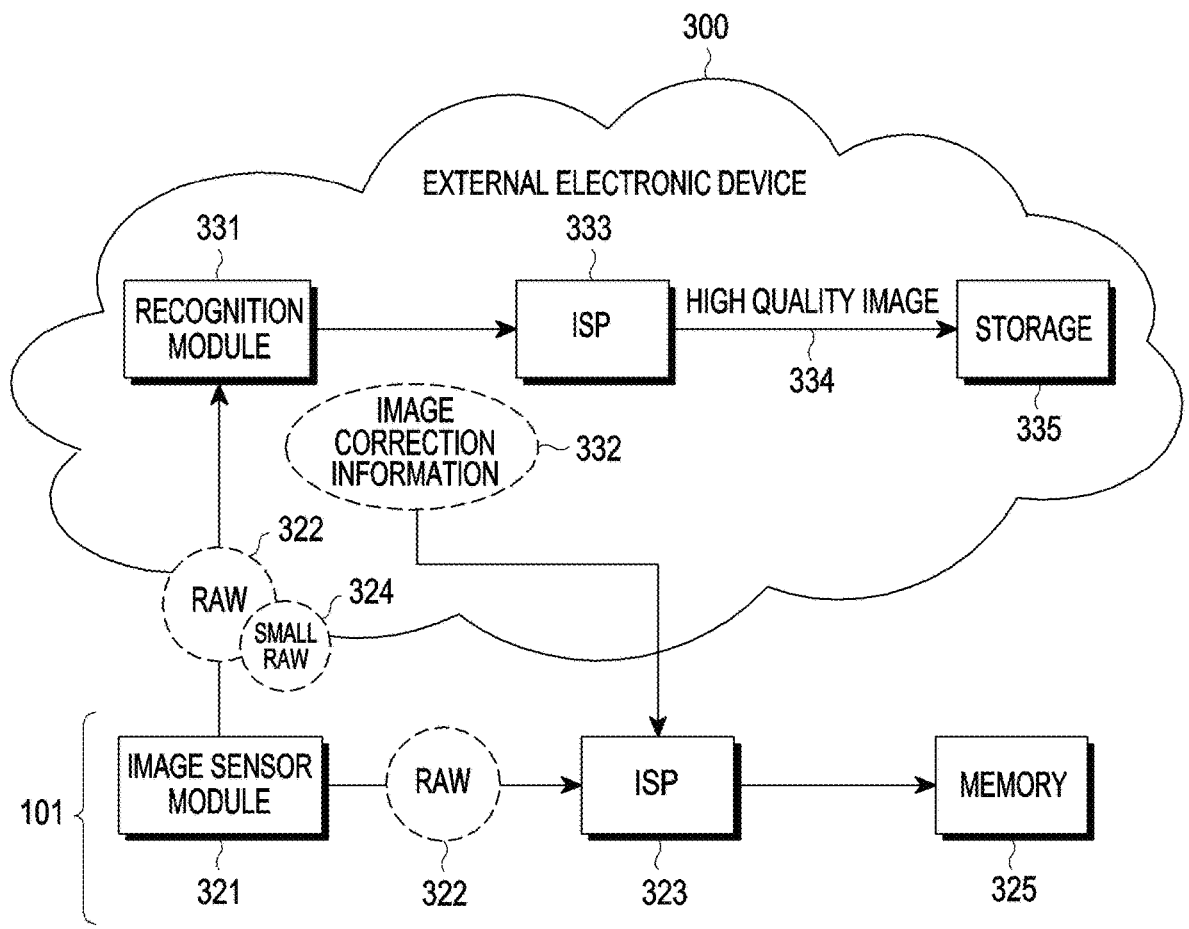
FIG. 3 is a diagram illustrating an example configuration in which an electronic device and an external electronic device operate according to various embodiments.

FIG. 3 is a diagram illustrating an example in which an electronic device and an external electronic device operate according to various embodiments.

An electronic device 101 may include an image sensor module 321, an image signal processor (ISP) (e.g., including image signal processing circuitry) 323, and a memory 325. An external electronic device 300 (e.g., a server 108) may include a recognition module (e.g., including recognition circuitry) 331, an ISP (e.g., including image signal processing circuitry) 333, and a storage 335.

The recognition module 331 may include various recognition circuitry and be a logical module or may be implemented as a processor of the external electronic device 300. The ISP 333 may include various processing circuitry and also be implemented as a processor of the external electronic device 300, and for example, the processor of the external electronic device 300 may perform both recognition and image processing. Although not shown, the electronic device 101 may include a communication module (e.g., a communication module 190) including various communication circuitry capable of transmitting and receiving data to and from the external electronic device 300. The external electronic device 300 may include a communication module capable of transmitting and receiving data to and from the electronic device 101.

The image sensor module 321 (e.g., an image sensor 230) may acquire an image for an external object and generate a raw image 322 corresponding to the acquired image. The image sensor module 321 may transmit the raw image 322 to the ISP 323. In various example embodiments, the image sensor module 321 may generate a small raw image 324 and transmit the generated small raw image 322 to the external electronic device 300 via the communication module. In another embodiment, a processor of the electronic device 101 other than the image sensor module 321 may generate the small raw image 324, and the generated small raw image 324 may be transmitted to the external electronic device 300 via the communication module. The image sensor module 321 may transmit the raw image 322 in a compressed state to the ISP 323 or the external electronic device 300. The image sensor module 321 may compress the raw image 322 for partial processing of the raw image 322 and may store the compressed raw image 322 in a memory within the image sensor module 321. The recognition module 331 of the external electronic device 300 may acquire the small raw image 324 via the communication module, and may segment at least one image segment from the small raw image 324. The recognition module 331 may recognize each of the at least one image segment segmented by the segmentation result. Correction segment information (e.g., image correction information) 332 including at least one piece of information associated with a plurality of image segments generated from the recognition module 331, for example, coordinate information and/or a recognition result of the image segment may be generated. The correction segment information 332 may be transmitted to the electronic device 101. The ISP 323 may use the correction segment information 332 to correct the raw image 322 and thus the corrected image can be generated. The corrected image may have a format of, for example, YUV. The corrected image may be stored in the memory 325. The corrected image may be compressed, for example, in accordance with a JPEG scheme, and the compressed image may be stored in the memory 325.

In various embodiments, the raw image 322 provided from the image sensor module 321 may be transmitted to the external electronic device 300 separately from the small raw image 324. Since the raw image 322 is larger in capacity than the small raw image 324, the small raw image 324 may first be transmitted to the external electronic device 300, and then the raw image 322 may be transmitted to the external electronic device 300. For example, the raw image 322 may be transmitted to the external electronic device 300 while the ISP 323 corrects the raw image 322. The raw image 322 may be uploaded to the external electronic device 300 as generated by the image sensor module 321, or a pre-processing image in which lens distortion compensation or noise removal is performed may be uploaded. The above-described pre-processing may be performed in the external electronic device 300. The external electronic device 300 may perform demosaic processing, image format modification, or pre-processing to increase an image recognition rate. The ISP 333 of the external electronic device 300 may correct the received raw image 322. The external electronic device 300 may correct the raw image 322 using the previously created correction segment information 332 or may correct the raw image 322 using the extended correction segment information. The raw image 322 may have a higher resolution than that of the small raw image 324 so that the ISP 333 of the external electronic device 300 can obtain more detailed extended correction segment information from a high quality image. The ISP 333 may generate the extended correction segment information using the previously created correction segment information and the raw image 322 together. The ISP 333 may acquire a high quality image 334 by correcting the raw image 322 using the extended correction segment information. The high quality image 334 may be stored in the storage 335 of the external electronic device 300 and downloaded to the electronic device 101.

Figure 4:
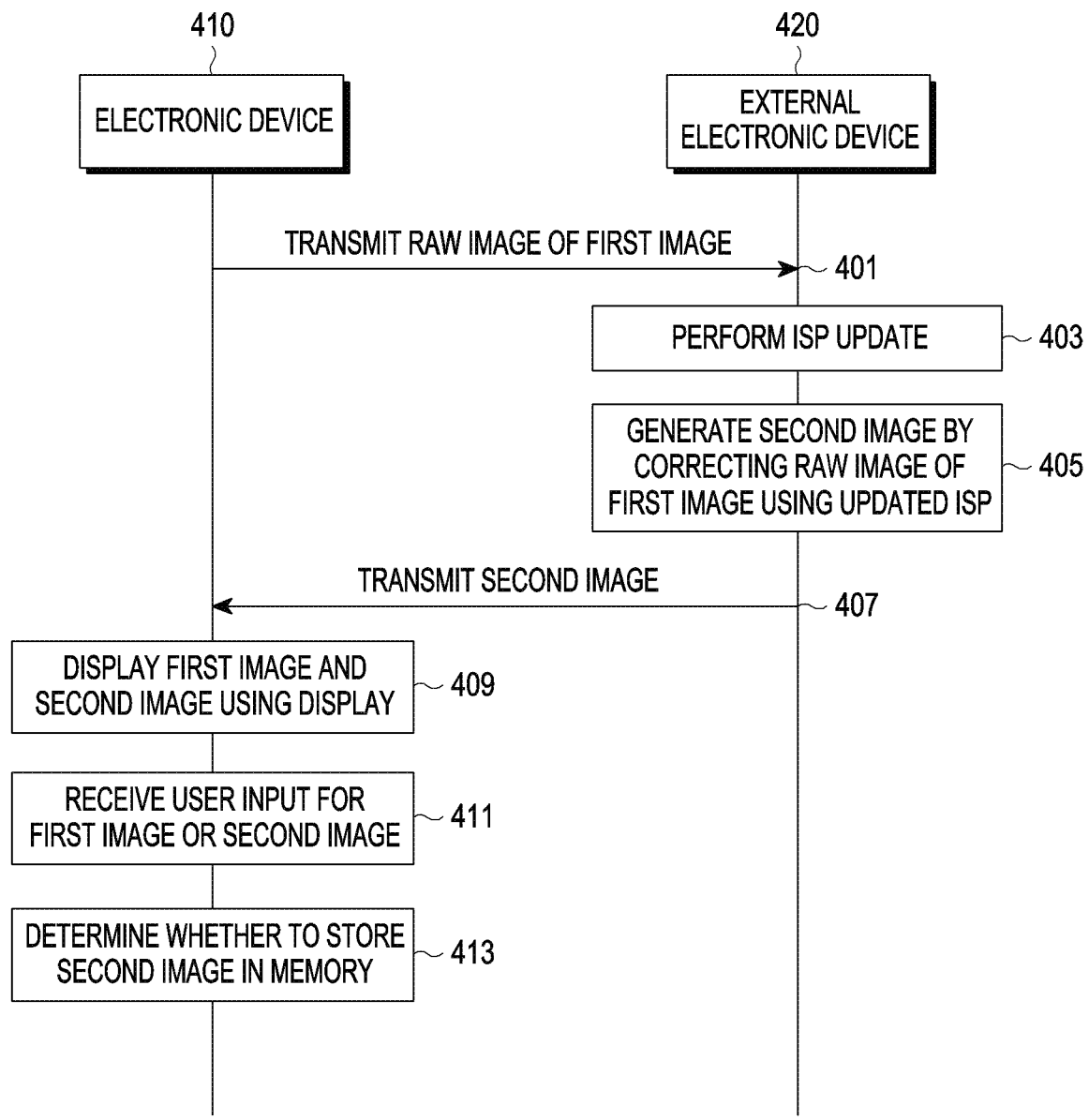
FIG. 4 is a flowchart illustrating an example in which an electronic device and an external electronic device operate according to various embodiments.
Figure 5:
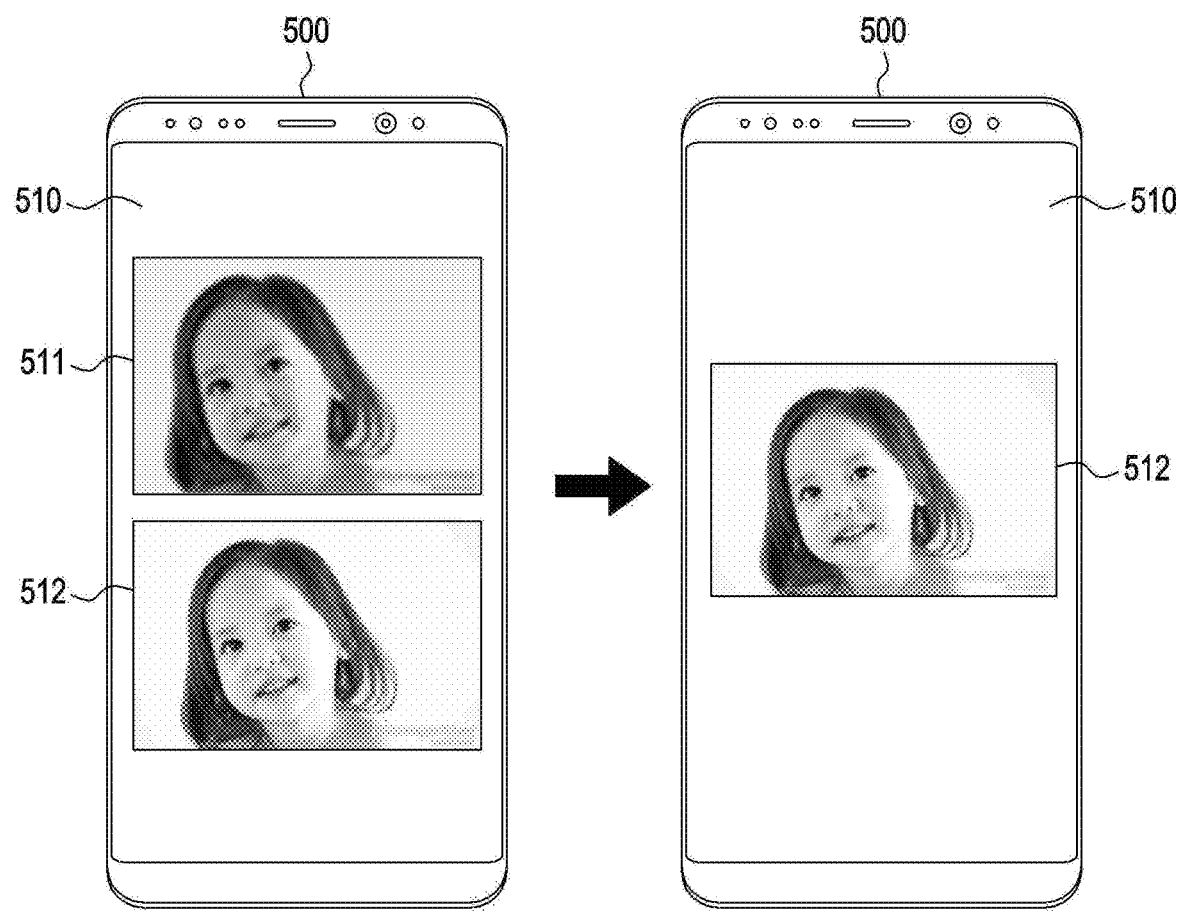
FIG. 5 is a diagram illustrating an example in which an electronic device displays a first image and a second image on a display according to various embodiments.

FIG. 4 is a flowchart illustrating an example in which an electronic device and an external electronic device operate according to various embodiments. FIG. 5 is a diagram illustrating an example in which an electronic device displays a first image and a second image on a display according to various embodiments.

In operation 401, an electronic device 410 (the electronic device 101 of FIG. 1 or a processor 120) may transmit a raw image of the first image to an external electronic device 420 (e.g., the external electronic device 300 of FIG. 3). The external electronic device 420 may receive the raw image of the first image from the electronic device 410 and may store the raw image in a memory included in the external electronic device 420. The external electronic device 420 may receive a compressed image obtained by the electronic device 410 compressing the raw image, and may decompress the received compressed image to store the raw image in the memory. For example, the electronic device 410 may acquire the raw image using a camera module 180. The electronic device 410 may transmit the raw image to the external electronic device 420 in operation 401. Although not shown, the external electronic device 420 may generate the first image by correcting the raw image using an ISP prior to being updated and may transmit the generated first image to the electronic device 410. The electronic device 410 may store or display the received first image.

In operation 403, the external electronic device 420 may perform an ISP (e.g., the ISP 333 of FIG. 3) update. The external electronic device 420 may perform the ISP update to change an image correction scheme. The external electronic device 420 may perform the ISP update to change the image correction scheme associated with at least one stat of stats such as, for example, and without limitation, brightness, lightness, color, saturation, color temperature, sharpness, color harmony, vivid, contrast, hue saturation value (HSV), etc.

In operation 405, the external electronic device 420 may correct the raw image corresponding to the first image using the updated ISP 333 to generate the second image.

In operation 407, the external electronic device 420 may transmit the generated second image to the electronic device 410.

According to an embodiment, the external electronic device 420 may transmit the generated second image to the electronic device 410. According to an embodiment, the external electronic device 420 may perform image processing (e.g., correction) by adjusting stats such as, for example, and without limitation, energy values (e.g., brightness, lightness, color, saturation, color temperature, sharpness, color harmony, vivid, contrast, HSV, etc.) of the received raw image. In various embodiments, image processing may be performed based on recipe information (e.g., image segment, layer, vector, scene category, etc.) acquired through image recognition. For example, the external electronic device 420 may recognize an image segment in which an object is located in the raw image as an object to be corrected and may perform correction on the image segment. The external electronic device 420 may receive additional information (e.g., a feature vector indicating a feature of an object or a part (e.g., hair) thereof) corresponding to the recipe information from a database and may use the received additional information in image processing. Image processing may include functions such as, for example, and without limitation, white balance, color adjustment, noise reduction, sharpening, detail enhancement, and the like. The external electronic device 420 may store an image subjected to image processing in the memory or may transmit the same to the electronic device 410. The external electronic device 420 may encode the processed image, compress the encoded image, and transmit the compressed image to the electronic device 410.

According to another embodiment, the external electronic device 420 may acquire recipe information for generating the second image by correcting the raw image received from the electronic device 410. The external electronic device 420 may transmit the acquired recipe information to the electronic device 410. For example, the external electronic device 420 may transmit the acquired recipe information to the electronic device 410 so that the electronic device 410 may generate the second image by correcting the raw image using the acquired recipe information, or the external electronic device 420 may transmit the second image generated using the recipe information to the electronic device 410 by correcting the raw image. The electronic device 410 may correct the raw image using the recipe information received from the external electronic device 420 to generate the second image or may receive the second image corrected by the external electronic device 420.

In operation 409, the electronic device 410 may display the first image and the second image using a display. Referring to FIG. 5, an electronic device 500 (e.g., the electronic device 101 of FIG. 1 or the electronic device 410 of FIG. 4) may display a first image 511 and a second image 512 through a display 510 (e.g., a display device 160 of FIG. 1). For example, the electronic device 500 may display the first image 511 on a first segment (or portion) of the display 510 and may display the second image 512 on a second segment (or portion) of the display 510. When the first image 511 and the second image 512 are displayed on the display 510 of the electronic device 500, a user can identify the second image 512 in which a raw image corresponding to the first image is corrected, together with the first image 511.

In FIG. 5, the first image 511 and the second image 512 are displayed on the first segment and the second segment, respectively, in FIG. 5. However, the first image 511 and the second image 512 may be alternately displayed on the same segment of the display 510 at different times. The user can compare changes in the first image 511 and the second image 512 alternately displayed on the display 510 to identify the second image 512 in which the raw image corresponding to the first image is corrected.

In operation 411, the electronic device 410 may receive an input (e.g., a user input) for a first image or a second image. In operation 413, the electronic device 410 may determine whether to store the second image in a memory of the electronic device.

For example, in FIG. 5, the electronic device 500 may detect an input (e.g., a user input) for one of the first image 511 and the second image 512, and may store the image corresponding to the user input in a memory (not shown, e.g., the memory 130 of FIG. 1). For example, when detecting the user input for the second image 512, the electronic device 500 may delete the first image 511 stored in the memory and may store the second image 512 in the memory 130 in place of the first image 511. The electronic device 500 may display the second image 512 stored in the memory on the display 510 of the electronic device 500. According to another embodiment, when receiving the user input for the first image 511, the electronic device 500 may display the first image 511 on the display 510 and may delete the second image 512 from the memory 130. The electronic device 500 may store both the first image 511 and the second image 512 in the memory without deleting one of the first image 511 and the second image 512.

Figure 6:
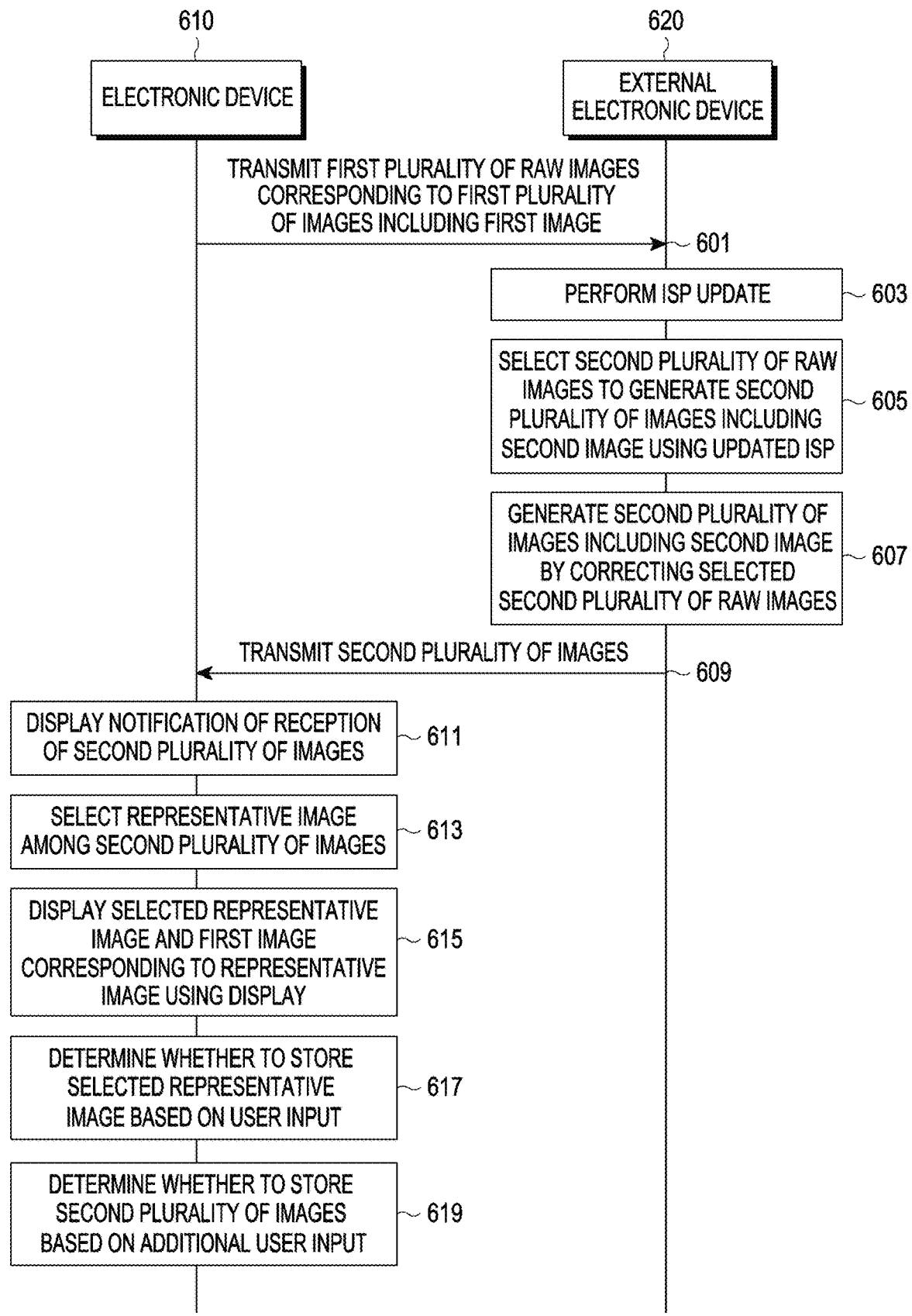
FIG. 6 is a flowchart illustrating an example in which an electronic device and an external electronic device operate according to various embodiments.

FIG. 6 is a flowchart illustrating an example in which an electronic device and an external electronic device operate according to various embodiments.

In operation 601, an electronic device 610 (e.g., the electronic device 101 of FIG. 1, the electronic device 410 of FIG. 4, or the processor 120 of FIG. 1) may transmit a first plurality of raw images corresponding to a first plurality of images including a first image to an external electronic device 620 (e.g., the external electronic device 300 of FIG. 3 or the external electronic device 420 of FIG. 4). The first plurality of raw images may or may not be transmitted to the external electronic device 620 in one operation. For example, each of the first plurality of raw images may be transmitted to the external electronic device 620 at a point in time associated with a point in time at which each of the first plurality of raw images is photographed.

The external electronic device 620 may receive the first plurality of raw images corresponding to the first plurality of images from the electronic device 610 and may store the received raw images in a memory (e.g., the storage 335 of FIG. 3) included in the external electronic device 620. The external electronic device 620 may receive a first plurality of compressed images generated by the electronic device 610 compressing the first plurality of raw images and may decompress the received first plurality of compressed images, and may store the decompressed images in the memory 335.

In operation 603, the external electronic device 620 may perform an ISP update. The external electronic device 420 may perform the ISP update to change an image correction scheme. For example, the external electronic device 420 may perform the ISP update to change the image correction scheme associated with at least one stat of stats such as, for example, and without limitation, brightness, lightness, color, saturation, color temperature, sharpness, color harmony, vivid, contrast, HSV, etc.

In operation 605, the external electronic device 620 may select a second plurality of raw images to generate a second plurality of images including a second image using the updated ISP. The number of the second plurality of raw images may be the same as the number of the first plurality of raw images or may be smaller than the number of the first plurality of raw images. For example, the external electronic device 620 may perform correction on the entire stored raw images using the updated ISP, or may perform correction on some of the raw images other than the entire stored raw images using the updated ISP. In operation 607, the external electronic device 620 may correct the selected second plurality of raw images to generate the second plurality of images including the second image.

According to another embodiment, the external electronic device 620 may acquire recipe information for generating the second plurality of images by correcting the first plurality of raw images received from the electronic device 610. The external electronic device 620 may transmit the acquired recipe information to the electronic device 610. For example, the external electronic device 620 may transmit the acquired recipe information to the electronic device 610 so that the electronic device 610 may generate the second plurality of images by correcting the first plurality of raw images using the recipe information, or the external electronic device 620 may transmit the second plurality of images generated using the recipe information to the electronic device 610. An example configuration for selecting the second plurality of raw images and generating the second plurality of images including the second image will be described in greater detail below with reference to FIGS. 7 and 8.

Figure 7:
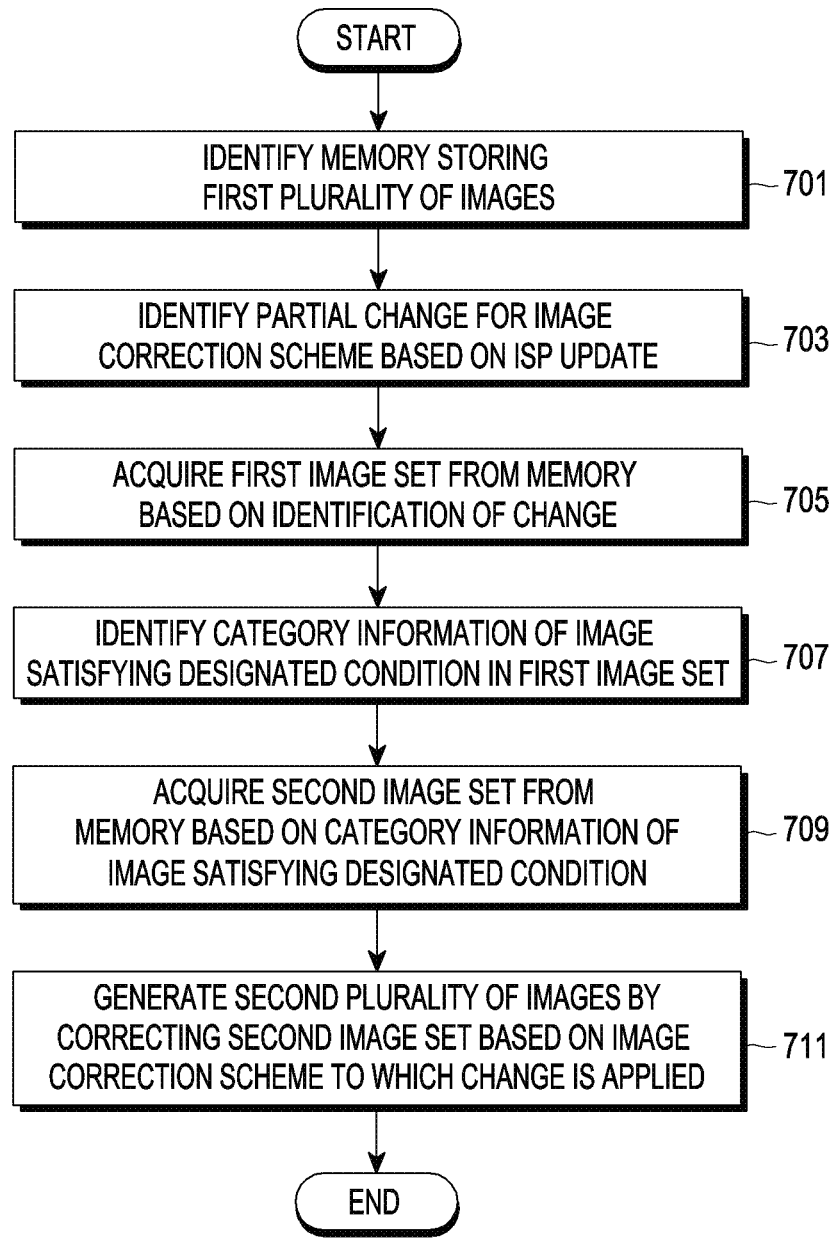
FIG. 7 is a flowchart illustrating an example in which an external electronic device performs image correction according to various embodiments.

FIG. 7 is a flowchart illustrating an example in which an external electronic device performs image correction according to various embodiments.

In operation 701, an external electronic device (e.g., the external electronic device 300 of FIG. 3, the external electronic device 420 of FIG. 4, the external electronic device 620 of FIG. 6, or the ISP 333 of FIG. 3) may identify a memory (e.g., the storage 335 of FIG. 3) that stores a first plurality of raw images. The memory 335 of the external electronic device 620 may include category information associated with images. According to an embodiment, a processor (e.g., the ISP 333 of FIG. 3) may recognize at least one object (e.g., person, sky, cloud, cat, dog, etc.) in a received image. For example, the object may be recognized in an image segment in the image. According to an embodiment, the processor (e.g., the ISP 333 of FIG. 3) may perform object recognition on the image based on user information. For example, the user information may be acquired from images (e.g., photos of family and relatives, photos of a residential house, etc.) registered in the memory 335. The recognized result may include location information (e.g., pixel coordinates) of each of image segments and identification information of an object associated with each of the image segments, and may be used when the processor (e.g., the ISP 333 of FIG. 3) performs image processing or when a first image set to be tested is selected.

The processor (e.g., the ISP 333 of FIG. 3), according to various embodiments, may store identification information of the object(s) recognized from the received image in a storage (e.g., the storage 335 of FIG. 3) in association with a corresponding image, as category information of the corresponding image. The category information may include a plurality of categories that are hierarchically categorized. For example, when a "cat" is recognized as an object of an image segment, the processor (e.g., the ISP 333 of FIG. 3) may set identification information indicating "animal" as an upper category of the corresponding image and set identification information indicating "cat" as a lower category of the corresponding image, and may store the set identification information in the memory in association with the corresponding image. According to another embodiment, the external electronic device (e.g., the external electronic device 300 of FIG. 3) may receive category information corresponding to an image (e.g., a raw image or a small raw image) from the electronic device (e.g., the electronic device 101 of FIG. 1) without generating category information, and may store the received category information in the memory 335 in association with the corresponding image.

The processor (e.g., the ISP 333 of FIG. 3), according to various embodiments, may perform image processing (e.g., correction) on a received first plurality of images by adjusting stats such as, for example, and without limitation, energy values (e.g., brightness, lightness, color, saturation, color temperature, sharpness, color harmony, vivid, contrast, HSV, etc.) of the received image. Image processing may be performed based on recipe information (e.g., image segment, layer, vector, scene category, etc.) obtained through image recognition. For example, the processor (e.g., the ISP 333 of FIG. 3) may recognize an image segment in which an object is located in the image as an object to be corrected and may perform correction on the image segment. The processor (e.g., the ISP 333 of FIG. 3) may receive additional information (e.g., a feature vector indicating a feature of an object or a part (e.g., hair) thereof) corresponding to the recipe information from the memory 335 and may use the received additional information in image processing. The processed image may be stored in the electronic device (e.g., the electronic device 101 or the memory (e.g., the storage 335). Image processing may include functions such as white balance, color adjustment, noise reduction, sharpening, detail enhancement, and the like. Such functions may be performed for each image segment based on the recipe information.

In operation 703, the external electronic device 620 may identify some (e.g., partial) changes in an image correction scheme based on the ISP update. In operation 705, the external electronic device 620 may acquire a first image set from the memory, based on the identification of the changes. For example, the external electronic device 620 may acquire the first image set by acquiring objects to be tested evenly for each category (e.g., an upper category or a lower category) in the database (e.g., the storage 335). For example, the external electronic device 620 may acquire images that are classified into a "dog" category corresponding to a lower category in "animal", which is an upper category, as the first image set.

For example, the processor (e.g., the ISP 333 of FIG. 3) of the external electronic device 620 may identify that at least some functions of the processor (e.g., the ISP 333 of FIG. 3) have been updated. The processor (e.g., the ISP 333 of FIG. 3) may acquire first data on at least one stat by correcting each of the images of the first image set using an image correction scheme to which the changes are not applied, and may acquire second data on the at least one stat by correcting the same using the image correction scheme to which the changes are applied. For example, the first data and the second data are values indicating the effect of the image correction, and may include a value for at least one stat of stats such as, for example, and without limitation, brightness, lightness, color, saturation, color temperature, sharpness, color harmony, vivid, contrast, HSV, etc. The processor (e.g., the ISP 333 of FIG. 3) may calculate a difference between the first data and the second data for each of the images of the first image set. According to another embodiment, the external electronic device 620 may acquire the first data corresponding to the first image set from the first image set stored in the memory (e.g., the storage 335) without correcting the first image set.

The processor (e.g., the ISP 333 of FIG. 3), according to various embodiments, may calculate a difference between the first data and the second data for each of the images included in the first image set acquired from the memory (e.g., the storage 335). For example, the processor (e.g., the ISP 333 of FIG. 3) may select at least one stat of stats such as, for example, and without limitation, brightness, lightness, color, saturation, color temperature, sharpness, color harmony, vivid, contrast, HSV, etc., based on a tuning policy (e.g., effect) expected according to the change in the correction scheme, as an object to be compared. For example, when the effect expected by the change in the correction scheme is a contrast increase, the processor (e.g., the ISP 333 of FIG. 3) may calculate a difference between a contrast value acquired by the image correction performed by the processor (e.g., the ISP 333 of FIG. 3) before the update and a contrast value acquired by the image correction performed by the processor (e.g., the ISP 333 of FIG. 3) after the update, with respect to each of the objects to be tested. According to another embodiment, when the expected effect is a vivid increase of an image segment having an HSV of about 30 to 60 degrees, the processor (e.g., the ISP 333 of FIG. 3) may calculate a difference between a color value acquired by the image correction performed by the processor (e.g., the ISP 333 of FIG. 3) before the update and a color value acquired by the image correction performed by the processor (e.g., the ISP 333 of FIG. 3) after the update for each of the images to be tested.

In operation 707, the external electronic device 620 may identify category information of an image satisfying a condition designated in the first image set. The designated condition may mean, for example, that the difference between the first data and the second data exceeds a threshold value. In operation 709, the external electronic device 620 may acquire the image satisfying the designated condition from the first image set, and may acquire a second image set including a second plurality of images from the memory 335 based on the category information of the acquired images and the difference between the first data and the second data of the images (e.g., which satisfy a designated condition). The second image set including the second plurality of images may have the same category information as that of the images satisfying the designated condition included in the first image set and may have a value larger than a threshold value by which the difference between the first data and the second data is designated.

The processor (e.g., the ISP 333 of FIG. 3), according to various embodiments, may classify the first image set corresponding to objects to be tested into two groups based on a comparison result. For example, the processor (e.g., the ISP 333 of FIG. 3) may classify the objects to be tested into an upper group having a difference value exceeding a designated threshold value and a lower group having a difference value below the threshold value. Here, the difference value may be a difference between the first data acquired by the image correction using the processor (e.g., the ISP 333 of FIG. 3) before the update and the second data acquired by the image correction using the processor (e.g., the ISP 333 of FIG. 3) after the update.

The processor (e.g., the ISP 333 of FIG. 3), according to various embodiments, may acquire the second image set corresponding to objects to be corrected, based on the acquired comparison result. For example, the processor (e.g., the ISP 333 of FIG. 3) may select objects to be corrected among images stored in the memory (e.g., the storage 335 of FIG. 3). The objects to be corrected may be subjected to image processing by a correction scheme (e.g., the processor (e.g., the ISP 333 of FIG. 3) after the update) to which a change (e.g., replacement or update) is applied, and the image-processed objects may be stored in the memory (e.g., the storage 333 of FIG. 3) or transmitted to the electronic device (e.g., the electronic device 101). According to an embodiment, the processor (e.g., the ISP 333 of FIG. 3) may recognize a lower group as a group whose correction effect is less than expected, and thus may identify categories of images belonging to the lower group, thereby determining that the images corresponding to the categories of the lower group are not the objects to be corrected. The processor (e.g., the ISP 333 of FIG. 3) may select at least one object to be tested among the upper group and may determine images corresponding to the category of the selected object to be tested among the images stored in the memory (e.g., the storage 335) to be the objects to be corrected.

According to various embodiments, the category information used in determining the object to be corrected for determining the second image set may include information which is acquired by the processor (e.g., the ISP 333 of FIG. 3) and stored in the memory (e.g., the storage 335 of FIG. 3) in association with the corresponding image. The category information may include information which is received from an external device (e.g., the electronic device 400) as metadata of the corresponding image and stored in the memory, together with the corresponding image.

According to various embodiments, the processor (e.g., the ISP 333 of FIG. 3) may determine the second image set according to (e.g., based on) the image processing result for each image included in the first plurality of images included in the memory 335 using at least one stat. Accordingly, some images among the image set corresponding to a specific category (e.g., a cat) used at the time of comparison by the processor (e.g., the ISP 333 of FIG. 3) may belong to an upper group for a specific stat (e.g., vivid), and the remaining images among the image set may belong to a lower group for the specific stat. In this example, the processor (e.g., the ISP 333 of FIG. 3) may determine that the images belonging to the lower group for the specific stat among images having a category "cat" cannot have desired correction effects, with respect to the specific stat (e.g., vivid) from which the desired effect is to be obtained, and may exclude images belonging to the lower group while having the category "cat" from the objects to be corrected.

In various embodiments, according to the comparison result acquired by the processor (e.g., the ISP 333 of FIG. 3), as for images included in an image set corresponding to designated metadata (e.g., ISO), some images belong to an upper group with respect to the designated stat (e.g., vivid) from which the processor (e.g., the ISP 333 of FIG. 3) wants to acquire the desired effect, but the remaining images may belong to a lower group. The same content may be applied to recipe information (e.g., scene category). The processor (e.g., the ISP 333 of FIG. 3) determines that images corresponding to a lower group for a specific stat among images having the metadata or the recipe information have correction effects less than expected and may exclude the corresponding images from objects to be corrected.

According to an embodiment, the processor (e.g., the ISP 333 of FIG. 3) may determine the object to be corrected, further based on at least one of the metadata and the recipe information in addition to the comparison result. For example, a correction target determination module 850 (see, e.g., FIG. 8) may identify metadata (hereinafter, referred to as an "upper metadata set") of the objects to be tested, which belong to an upper group, and may identify a plurality of pieces of metadata (hereinafter, referred to as a "lower metadata set") of the objects to be tested, which belong to a lower group. The processor (e.g., the ISP 333 of FIG. 3) may compare the upper metadata set with the lower metadata set to identify (a plurality of pieces of) metadata (hereinafter, referred to as a "duplicate metadata set") included even in the upper metadata set among the lower metadata set. The correction target determination module 850 may determine that images which do not correspond to at least two pieces of metadata among the duplicate metadata set while corresponding to at least one piece of metadata among the upper metadata set are objects to be corrected. For example, and without limitation, a first ISO sensitivity value, a second ISO sensitivity value, a first brightness value, a second brightness value, a first lightness value, and a second lightness value, or the like, may be included in the upper metadata set, and when the first ISO sensitivity value, the second brightness value, and the first lightness value among these are determined to be duplicate metadata, images having the first ISO sensitivity value, the second brightness value, and the second lightness value may be determined to be objects to be corrected. Images having the first ISO sensitivity value, the first brightness value, and the second lightness value may be excluded from the object to be corrected.

According to various embodiments of the present disclosure, the metadata may be data which is received from an external device (e.g., the electronic device 400) together with the corresponding image and is stored in the memory (e.g., the storage 335) in association with the corresponding image. For example, the metadata may be information acquired by an image sensor (e.g., the image sensor module 321), and may include, for example, and without limitation, a focal length, an autofocus area, left and right rotation-related information (orientation) at the time of photographing, auto white balance (AWB), a color space, an exposure time, aperture-related information (e.g., F-number or F-stop), a capturing mode (exposure program) (e.g., auto, aperture priority, shutter priority, manual, etc.), ISO (ISO speed ratings), an image capturing date (data time original), or the like. In addition, the metadata may include information sensed by sensors other than the image sensor, such as an image capturing place or illuminance at the time of capturing.

According to various embodiments, the recipe information may include information (e.g., image segment, layer, vector, scene category, etc.) acquired by the processor (e.g., the ISP 333 of FIG. 3) recognizing an image (e.g., small raw image) received from a device (e.g., the electronic device 101).

According to various embodiments of the present disclosure, the correction target determination module 850 may include various circuitry and/or executable program elements and determine an object to be corrected, further based on a tuning policy (e.g., effect). For example, in a case in which an image is corrected by a correction scheme (e.g., the processor (e.g., the ISP 333 of FIG. 3) after an update) to which a change (or replacement or update) is applied, when the expected effect is a brightness increase, the processor (e.g., the ISP 333 of FIG. 3) may apply a weight to a difference value in brightness (e.g., adds a predetermined value to the difference value), so that an object to be tested, in which correction result brightness is increased, may be preferentially classified into the upper group.

According to various embodiments, additional information as to whether the update ISP is suitable for a certain category or an image having a certain characteristic may be further included. The external electronic device 620 may identify the image set of the object to be corrected based on the additional information. In this case, the external electronic device 620 may directly select the image set corresponding to the additional information from the entire image without performing two-stage selection of selecting the first image set and selecting the second image set.

According to an embodiment, the external electronic device 620 may acquire a second plurality of raw images among a plurality of raw images stored in the memory 335, based on a designated condition that the first image set satisfies.

In operation 711, the external electronic device 620 may generate a second plurality of images by correcting the second plurality of raw images corresponding to the second image set, based on the image correction scheme to which the change is applied. According to one embodiment, the processor (e.g., the ISP 333 of FIG. 3) may perform image correction on the images that satisfy the designated condition of the first image set to generate the second plurality of images.

Figure 8:
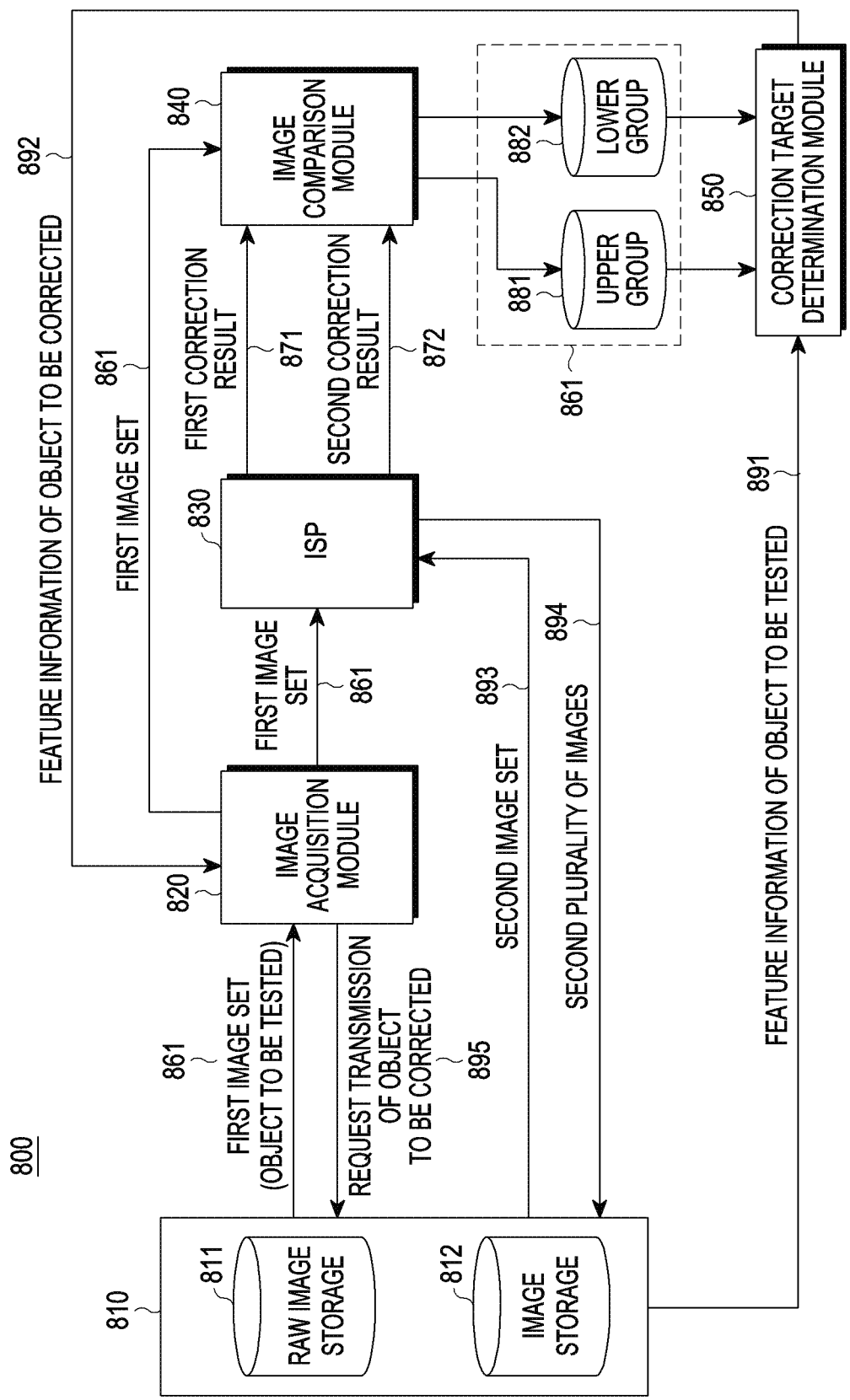
FIG. 8 is a diagram illustrating an example in which an external electronic device performs image correction according to various embodiments.

FIG. 8 is a diagram illustrating an example in which an external electronic device performs image correction according to various embodiments.

Referring to FIG. 8, an external electronic device 800 (e.g., the server 108 or the external electronic device 300 of FIG. 3), according to various embodiments, may include an image storage 810, an image acquisition module (e.g., including image acquisition circuitry and/or executable program elements) 820, an ISP (e.g., including various processing circuitry and/or executable program elements) 830, an image comparison module (e.g., including various image comparison circuitry and/or executable program elements) 840, and a correction target determination module (e.g., including various processing circuitry and/or executable program elements) 850.

According to various embodiments, the image storage 810, the image acquisition module 820, the ISP 830, the image comparison module 840, and the correction target determination module 850 are functionally connected to each other, and thus it is possible to freely transmit and share data between them. According to an embodiment, at least one of the above-mentioned modules may be a logical module, so that at least one processor (e.g., the processor 120 included in the electronic device 101 of FIG. 1 or the ISP 333 of the external electronic device 300 of FIG. 3) can perform operations thereof. According to an embodiment, the at least one of the modules may be implemented in hardware within the processor (e.g., the processor 120 included in the electronic device 101 of FIG. 1 or the ISP 333 of the external electronic device 300 of FIG. 3).

The image acquisition module 820, according to various embodiments, may generate a first image set 861 by acquiring some of the images stored in the image storage 810 (e.g., the memory 325 or the storage 335 of FIG. 3) as objects to be tested, and may transmit the generated first image set 861 to the ISP 830 and the image comparison module 840, respectively. For example, a method of extracting images evenly for each category may be applied to image acquisition. According to an embodiment, if the object (image) to be tested, which is acquired from the image storage 810, is compressed, the image acquisition module 820 may decompress the object to be tested using a decoder and then may transmit the decompressed object to the ISP 830.

In various embodiments, the ISP 830 (e.g., the ISP 333 of FIG. 3) may correct images of the first image set 861 and may transmit, to the image comparison module 840, a first correction result 871 and a second correction result 872 including energy values (e.g., at least one of brightness, lightness, color, saturation, color temperature, sharpness, color harmony, vivid, contrast, and HSV) indicating the correction result of each image.

The image comparison module 840 (e.g., the ISP 333 of FIG. 3), according to an embodiment, may compare the first image set 861 with the first correction result 871 (a correction image set) of the first image set 861, may classify the images of the first image set 861 into an upper group 881 and a lower group 882 based on the comparison result, and may transmit the classified result to the correction target determination module 850. An example of the classification replaces the various operations of the processor (e.g., the ISP 333) described in greater detail above with reference to FIG. 7.

The correction target determination module 850 (e.g., the ISP 333 of FIG. 3), according to various embodiments, may determine an object to be corrected, based on "category information" of the image included in at least "upper group 881" among category information of the image included in the upper group 881, category information of the image included in the lower group 882, metadata of the image included in the upper group 881, recipe information of the image included in the upper group 881, metadata of the image included in the lower group 882, and recipe information of the image included in the lower group 882.

The correction target determination module 850, according to various embodiments of the present disclosure, may acquire feature information 891 (e.g., category information, metadata, or recipe information) of an object to be tested, which is required for determining an object to be corrected, via the image storage 810. According to some embodiments, the feature information may be information included in the corresponding image itself. In this example, the correction target determination module 850 may acquire the feature information via another module (e.g., the image acquisition module 820 or the image comparison module 840) instead of the image storage 810 or may acquire the feature information from the first image set 861. The correction target determination module 850, according to various embodiments, may transmit feature information 892 of the object to be corrected to the image acquisition module 820. For example, the feature information 892 may include at least category information of category information, metadata, and recipe information.

The image acquisition module 820, according to various embodiments of the present disclosure, may request, in operation 895, the image storage 810 to transmit the object (a second image set 893) to be corrected to the ISP 830 by transmitting the feature information 892 to the image storage 810. The ISP 830 may receive a second image set 893 corresponding to a second plurality of raw images from the image storage 810, may generate a second plurality of images 894 by correcting the second image set 893, and may store the second plurality of images 894 in the image storage 810. According to some embodiments, the ISP 830 may have a configuration for acquiring an object to be corrected. In this example, the ISP 830 may directly receive the feature information 892 from the correction target determination module 850 and may acquire the second image set 893 through the image storage 810. Although the configurations described in FIGS. 7 and 8 are described as being performed only in the external electronic device 800 (e.g., the external electronic device 300 of FIG. 3), the same hardware configuration is also included in the electronic device 101 so that correction from the first plurality of images to the second plurality of images is possible.

Referring again to FIG. 6, in operation 609, the external electronic device 620 may transmit the second plurality of images to the electronic device 610. The external electronic device 620 may transmit recipe information for generating the second plurality of images to the electronic device 610. For example, the processor (e.g., the ISP 333 of FIG. 3) of the external electronic device 620 may transmit the second plurality of images acquired in FIG. 7 or 8 via the communication module, to the electronic device 610. The processor (e.g., the ISP 333 of FIG. 3) may encode the second plurality of images and transmit the encoded images to the electronic device 610, or may transmit the second plurality of images, which are not encoded, to the electronic device 610.

Figure 9A:
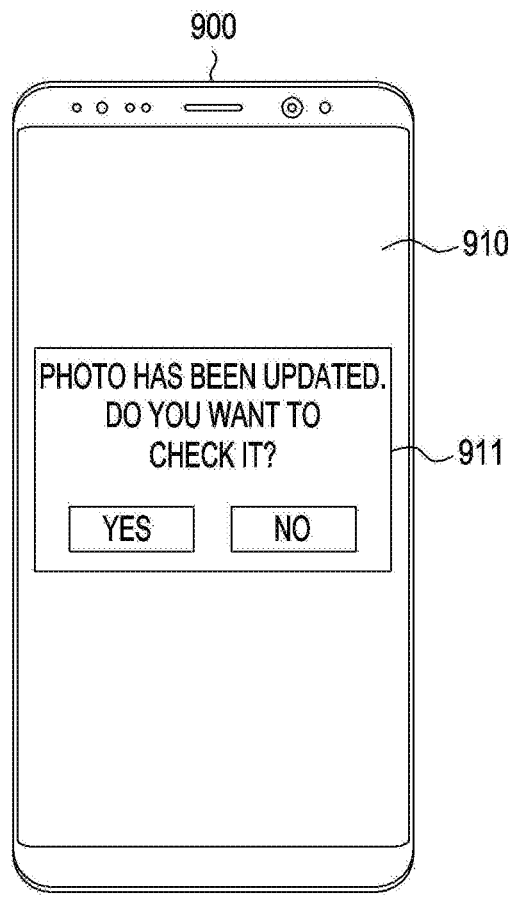

In operation 611, the electronic device 610 may display a notification indicating reception of the second plurality of images. FIG. 9A is a diagram illustrating an example interface in which an electronic device 900 (e.g., the electronic device 101 of FIG. 1) provides notification via a display 910 (e.g., the display device 160 of FIG. 1). The electronic device 900 may display a notification 911 indicating reception of the second plurality of images via the display 910. The electronic device 900 may detect a user input detected on the notification 911 displayed on the display 910.

In operation 613, the electronic device 610 may select a representative image of the second plurality of images. The electronic device 610 may select an image that most satisfies a designated condition among the second plurality of images as the representative image. For example, the electronic device 610 may select an image having the largest amount of change in designated stats among the second plurality of images as the representative image.

Figure 9B:
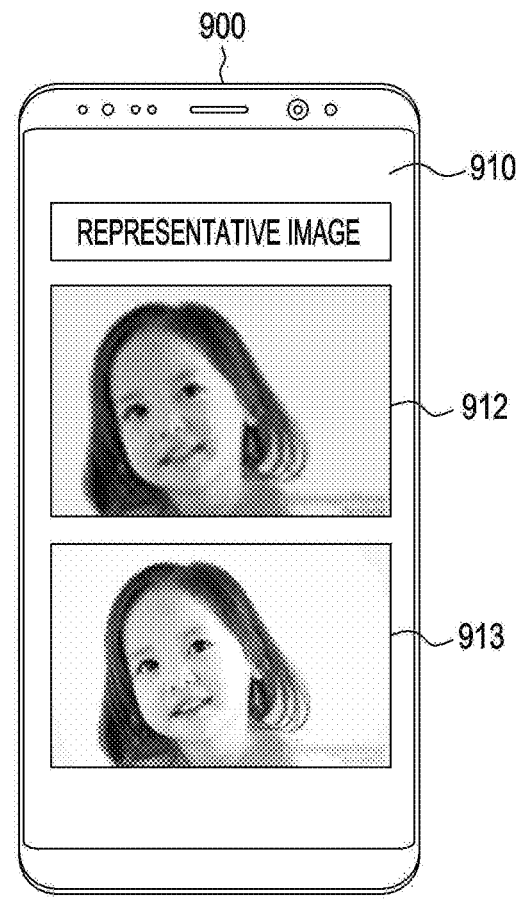

In operation 615, the electronic device 610 may display the selected representative image and a first image corresponding to the representative image using the display. FIG. 9B is a diagram illustrating an example interface in which the electronic device 900 (e.g., the electronic device 101 of FIG. 1) displays the representative image and the first image corresponding to the representative image on the display 910 (e.g., the display device 160 of FIG. 1). The electronic device 900 may display a representative image 913 on a second segment of the display 910 and display a first image 912 corresponding to the representative image 913 on a first segment of the display 910.

In operation 617, the electronic device 610 may determine whether to store the selected representative image, based on user input. Referring to FIG. 9B, the electronic device 900 may detect a user input for either the first image 912 or the representative image 913 and may store any one image corresponding to the user input in a memory (not shown, e.g., the memory 130 of FIG. 1). For example, when the electronic device 900 detects the user input for the representative image 913, the first image 912 stored in the memory 130 may be deleted and the representative image 513 may be stored in the memory. The electronic device 900 may display the representative image 913 stored in the memory on the display 910 of the electronic device 900. Although not shown in the drawings, when the electronic device 900 receives the user input for the first image 912, the first image 912 may be displayed on the display 910 and the representative image 913 may be deleted from the memory. The electronic device 900 may store both the first image 912 and the representative image 913 in the memory without deleting one of the first image 912 and the representative image 913.

In operation 619, the electronic device 610 may determine whether to store a second plurality of images based on an additional user input. The electronic device 610 may determine whether to store a second plurality of images, depending on whether to store the selected representative image without the additional user input. For example, when it is determined that the selected representative image is stored, the electronic device 610 may store the second plurality of images without the additional user input. FIGS. 9C and 9D are diagrams illustrating an example user interface for determining whether to store the second plurality of images based on user input. Referring to FIG. 9C, when receiving user input to store the representative image in the memory (e.g., the memory 130 of FIG. 1), the electronic device 900 may display the received second plurality of images 914 through a gallery application. The electronic device 900 may determine whether to store the second plurality of images based on an additional user input. The user may input the additional user input to selectively store at least a portion of the second plurality of images. Referring to 9D, the electronic device 900 may display some images 915 of the second plurality of images corresponding to some images of the first plurality of images stored in the memory 130, separately from the remaining images except for some images of the first plurality of images. For example, the outline of some images 915 of the second plurality of images may be highlighted and displayed.

Figure 10:
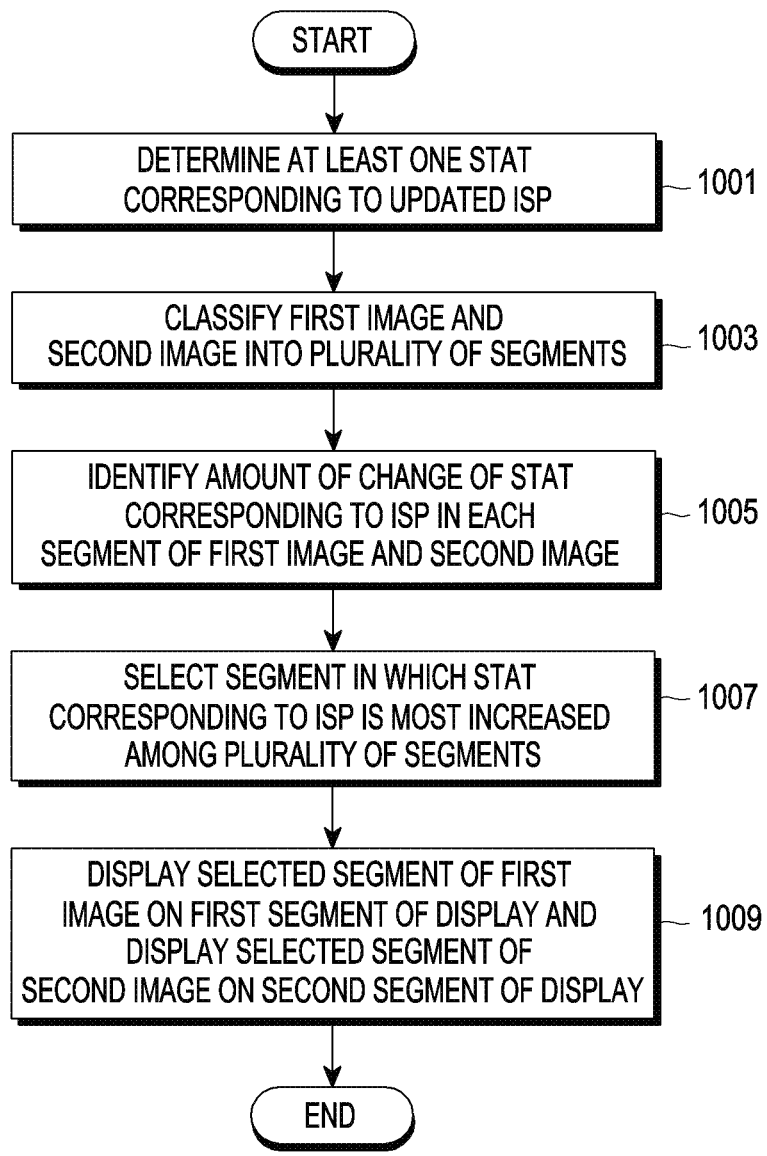
FIG. 10 is a flowchart illustrating an example in which an electronic device selects a segment according to an image signal processing (ISP) update from a first image according to various embodiments.
Figure 11:
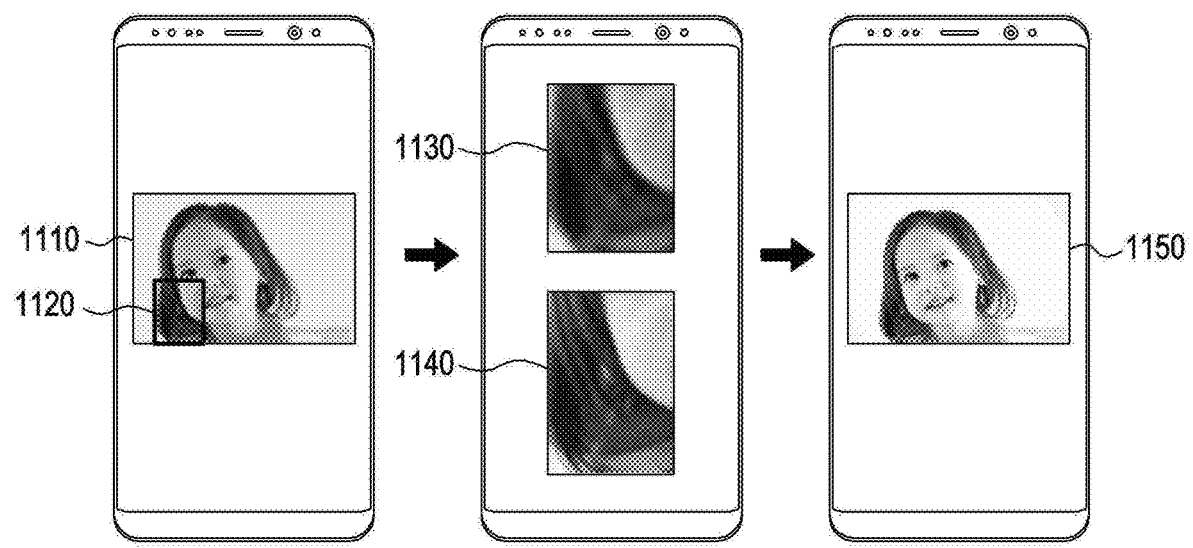
FIG. 11 is a diagram illustrating an example in which an electronic device selects and displays a segment according to an ISP update from a first image according to various embodiments.

FIG. 10 is a flowchart illustrating an example in which an electronic device selects a segment according to an ISP update according to various embodiments, and FIG. 11 is a diagram illustrating an example in which an electronic device selects and displays a segment according to an ISP update from a first image according to various embodiments.

In operation 1001, the electronic device 101 (e.g., the electronic device 101 of FIG. 1 or the processor 120 of FIG. 1) may determine at least one stat corresponding to an updated ISP (e.g., the ISP 333 of FIG. 3). A processor (e.g., the processor 120 of FIG. 1) of the electronic device 101 may receive information about the updated ISP (e.g., the ISP 333 of FIG. 3) from an external electronic device (e.g., the external electronic device 300 of FIG. 3). The information about the updated ISP may include information about a designated condition associated with a received second plurality of images. The designated condition associated with the second plurality of images has been described with reference to FIG. 7 and FIG. 8, and a description thereof will not be repeated here. The processor 120 may directly compare some images of a first plurality of images with a second plurality of images corresponding to some images of the first plurality of images without receiving the information about the designated condition from the external electronic device 300, thereby acquiring information about the at least one stat and information about the designated condition.

In operation 1003, the electronic device 101 may classify the first image and the second image into a plurality of segments. In operation 1005, the electronic device 101 may identify an amount of change in the stat corresponding to the ISP in each segment of the first image and the second image. In operation 1007, the electronic device 101 may select a segment in which the stat corresponding to the ISP among a plurality of segments is the most increased. The processor 120 may classify each of the first image and the second image into a plurality of segments based on information related to an object included in the first image, or the like. For example, the processor 120 may recognize the object in the first image and may classify the first image into a plurality of segments based on the recognized object. The processor 120 may select a segment in which the improvement is the greatest through correction by at least one stat among the plurality of segments and a segment in which a difference between the first data and the second data is the greatest. For example, in FIG. 11, the processor (e.g., the processor 120 of FIG. 1) may acquire a selected segment 1120 from a first image 1110 displayed on a display (e.g., the display device 160 of FIG. 1). For example, a second image 1150 among a plurality of segments of the first image 1110 and the selected segment 1120 having the largest difference between the first data and the second data can be obtained.

In operation 1009, the electronic device 101 may display a selected segment of the first image on a first segment of the display (e.g., the display device 160 of FIG. 1) and may display a selected segment of the second image on a second segment of the display 160. In operation 1007, the processor 120 may display the selected segment on the display.

Referring to FIG. 11, the processor 120 may display a selected segment 1130 of the first image 1110 on the first segment of the display 160 and may display a selected segment 1140 of the second image on the second segment of the display. The processor 120 may determine whether to store the second image received from the external electronic device based on user input for one of the selection segment 1130 of the first image and the selection segment 1140 of the second image. When the user input for the selection segment 1140 of the second image displayed on the second segment is received, the processor 120 may display the second image 1150 on the display and may store the second image 1150 in place of the first image 1110. Since the above configuration is as described above, a detailed description thereof will not be repeated here.

Figure 12:
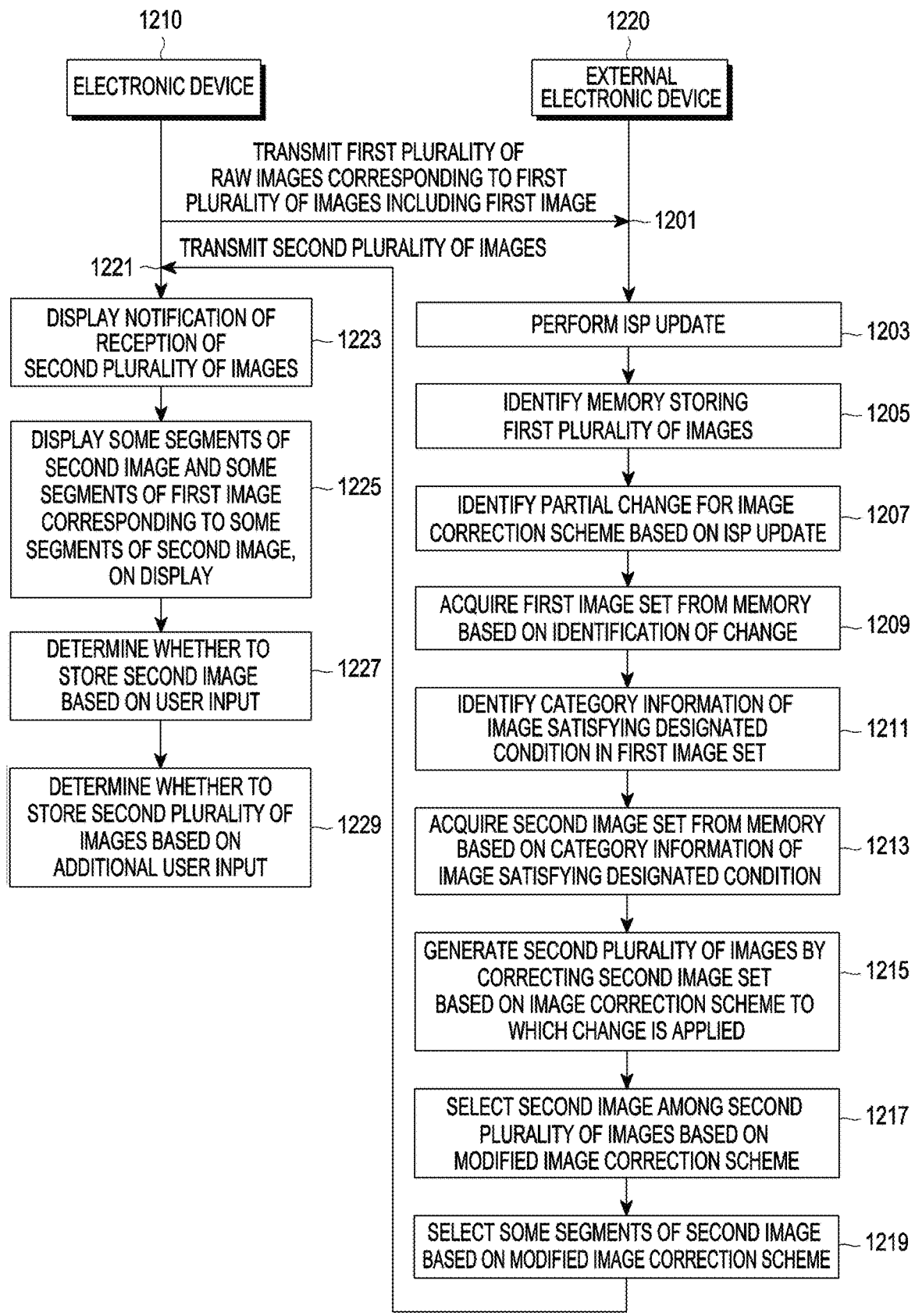
FIG. 12 is a flowchart illustrating an example operation in which an electronic device and an external electronic device select and display a representative image according to various embodiments.

FIG. 12 is a flowchart illustrating an example in which an electronic device and an external electronic device select and display a representative image according to various embodiments.

In operation 1201, an electronic device 1210 (e.g., the electronic device 101 of FIG. 1 or the processor 120 of FIG. 1) may transmit a first plurality of raw images corresponding to a first plurality of images including a first image to an external electronic device 1220 (e.g., the external electronic device 300 of FIG. 3). In operation 1203, the external electronic device 1220 (e.g., the external electronic device 300 of FIG. 3) may perform an ISP update. In operation 1205, the external electronic device 1220 may identify a memory that stores the first plurality of images. In operation 1207, the external electronic device 1220 may identify some changes in an image correction scheme based on the ISP update. In operation 1209, the external electronic device 1220 may acquire a first image set from a memory, based on the identification of the changes. In operation 1211, the external electronic device 1220 may identify category information of an image that satisfies a designated condition in the first image set. In operation 1213, the external electronic device 1220 may acquire a second image set from the memory, based on category information of the image that satisfies the designated condition. In operation 1215, the external electronic device 1220 may generate a second plurality of images by correcting the second image set, based on the image correction scheme to which the change is applied. Detailed descriptions of operation 1201 to operation 1215 have been made above, and thus will not be repeated here.

In operation 1217, the external electronic device 1220 may select a second image from the second plurality of images based on a modified image correction scheme. In operation 1219, the external electronic device 1220 may select some segments of the second image based on the modified image correction scheme. In FIG. 10, unlike the above description, the external electronic device 1220, as well as the electronic device 101, may select the second image from the second plurality of images based on the modified image correction scheme. In addition, the external electronic device 1220 may select the first image and some segments of the second image corresponding to the first image using the modified correction scheme. In operation 1221, the external electronic device 1220 may transmit the second plurality of images to the electronic device 1210.

In operation 1223, the electronic device 1210 may display a notification indicating reception of the second plurality of images on the display. In operation 1225, the electronic device 1210 may display some segments of the second image and some segments of the first image corresponding to some segments of the second image on the display. In operation 1227, the electronic device 1210 may determine whether to store the second image, based on user input. In operation 1229, the electronic device 1210 may determine whether to store the second plurality of images, based on an additional user input. Detailed descriptions of operation 1223 to operation 1229 have been described above, and thus will not be repeated here.

An electronic device, according to various example embodiments, may include a display, a memory, a communication module comprising communication circuitry, and a processor, wherein the processor is configured to control the electronic device to receive a second image corresponding to a first image stored in the memory from an external electronic device using the communication module, the second image being an image in which a raw image corresponding to the first image is corrected, to display the first image on a first segment (portion or area) of the display using the display and to display the second image on a second segment (portion or area) of the display, and to determine whether to store the second image in the memory based on an input for the first image or the second image.

According to an example embodiment, the processor is configured to control the electronic device to delete the second image when the first image is selected based on the input, and to delete the first image when the second image is selected based on the input.

According to an example embodiment, the processor is configured to control the electronic device to identify information associated with at least one stat used by the external electronic device to correct the second image, and to identify an amount of change of the at least one stat of a first plurality of images including the first image stored in the memory and a second plurality of images including the second image corresponding to the first plurality of images received from the external electronic device.

According to an example embodiment, the processor is configured to control the electronic device to select the first image having the highest amount of change of the stat with the second plurality of images from among the first plurality of images.

According to an example embodiment, the processor is configured to control the electronic device to display at least one image in which the amount of change of the stat with the second plurality of images satisfies a designated condition from among the first plurality of images.

According to an example embodiment, the processor is configured to control the electronic device to classify the first image into a plurality of segments, to identify an amount of change of at least one stat between the first image and the second image for each of the plurality of segments, to select at least one segment from the plurality of segments based on the amount of change of the at least one stat, to display the selected segment of the first image on the first segment, and to display the selected segment of the second image on the second segment.

According to an example embodiment, the memory is configured to store the first plurality of images including the first image and the external electronic device is configured to store a plurality of raw images corresponding to each of the first plurality of images, and the processor is configured to control the electronic device to receive the second plurality of images including the second image in which the selected at least one raw image is corrected based on at least one raw image being selected from among the plurality of raw images based on the information associated with the at least one stat used by the external electronic device to correct the second image, using the communication module.

According to an example embodiment, the processor is configured to control the electronic device to display a notification indicating reception of the second image based on the reception of the second image, to display the first image on the first segment of the display based on an input for the notification, and to display the second image on the second segment of the display.

According to an example embodiment, the processor is configured to control the electronic device to receive the second plurality of images including the second image corresponding to some images of the first plurality of images including the first image, via the communication module, and to display the second plurality of images separately from the remaining images except for some images of the first plurality of images.

A method of controlling an electronic device according to various example embodiments includes: receiving, from an external electronic device, a second image which is an image in which a raw image corresponding to a first image stored in a memory is corrected, the second image corresponding to the first image; displaying the first image on a first segment (portion or area) of a display and displaying the second image on a second segment (portion or area) of the display; and determining whether to store the second image in the memory based on an input for the first image or the second image.

The method according to an example embodiment may further include: deleting the second image when the first image is selected based on the input; and deleting the first image when the second image is selected based on the input.

The method according to an example embodiment may further include: identifying information associated with at least one stat used by the external electronic device to correct the second image; and identifying an amount of change of the at least one stat of a first plurality of images including the first image stored in the memory and a second plurality of images including the second image, corresponding to the first plurality of images received from the external electronic device.

The method according to an example embodiment may further include: selecting the first image having a highest amount of change of the stat with the second plurality of images from among the first plurality of images.

The method according to an example embodiment may further include: displaying at least one image in which the amount of change of the stat with the second plurality of images satisfies a designated condition from among the first plurality of images.

The method according to an example embodiment may further include: classifying the first image into a plurality of segments; identifying an amount of change of at least one stat between the first image and the second image for each of the plurality of segments; selecting at least one segment from the plurality of segments based on the amount of change of the at least one stat; and displaying the selected segment of the first image on the first segment and displaying the selected segment of the second image on the second segment.

The method according to an example embodiment may further include: storing the first plurality of images including the first image and storing, by the external electronic device, a plurality of raw images corresponding to each of the first plurality of images; and receiving the second plurality of images including the second image in which the selected at least one raw image is corrected when at least one raw image is selected among the plurality of raw images based on the information associated with the at least one stat used by the external electronic device to correct the second image.

The method according to an example embodiment may further include: displaying a notification indicating reception of the second image based on the reception of the second image, displaying the first image on the first segment of the display based on an input for the notification, and displaying the second image on the second segment of the display.

The method according to an example embodiment may further include: receiving the second plurality of images including the second image, corresponding to some images of the first plurality of images including the first image, via a communication module; and displaying the second plurality of images separately from the remaining images except for some images of the first plurality of images.

An electronic device according to various example embodiments may include: a communication module comprising communication circuitry; an image signal processing processor, and a processor, wherein the processor is configured to control the electronic device to receive, from an external electronic device, a plurality of raw images corresponding a first plurality of images included in a memory of the external electronic device using the communication module, to identify information associated with at least one stat of the plurality of raw images corresponding to the image signal processing processor, to select at least one raw image of the plurality of raw images using the information associated with the at least one stat, to generate at least one second image by correcting the at least one raw image, and to transmit the at least one second image to the external electronic device.

According to an example embodiment, the processor is configured to control the electronic device to select the raw image having a highest amount of change of the at least one stat between the plurality of raw images and the second plurality of image from among the plurality of raw images, and to transmit the second image in which the raw image having the highest amount of change of the at least one stat is corrected to the external electronic device.

According to an example embodiment, the memory is configured to store the plurality of raw images corresponding to each of the first plurality of images, and the processor is configured to control the electronic device to transmit, based on at least one raw image being selected from among the plurality of raw images based on information associated with at least one stat used by the processor to correct the second image, a second plurality of images including the second image in which the selected at least one raw image is corrected, through the communication module.

A method of controlling an electronic device according to various example embodiments may include: receiving, from an external electronic device, a plurality of raw images corresponding to a first plurality of images included in a memory of the external electronic device, using a communication module; identifying information associated with at least one stat of the plurality of raw images corresponding to the image signal processing processor; selecting at least one raw image from among the plurality of raw images using the information associated with the at least one stat; generating at least one second image by correcting the at least one raw image; and transmitting the at least one second image to the external electronic device.

The method according to an example embodiment may further include: selecting the raw image having a highest amount of change of the at least one stat between the plurality of raw images and the second plurality of image from among the plurality of raw images; and transmitting the second image in which the raw image having the highest amount of change of the at least one stat is corrected, to the external electronic device.

The method according to an example embodiment may further include: storing the plurality of raw images corresponding to each of the first plurality of images; and transmitting, based on at least one raw image being selected from among the plurality of raw images based on information associated with at least one stat used by the processor to correct the second image, a second plurality of images including the second image in which the selected at least one raw image is corrected, through the communication module.

The electronic device according to various embodiments may be one of various types of electronic devices. The electronic devices may include, for example, and without limitation, a portable communication device (e.g., a smart phone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, and/or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, firmware, or any combinations thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply refers to a storage medium that is a tangible device, but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments thereof, it will be understood that the various example embodiments are intended to be illustrative, not limiting. Therefore, one skilled in the art will understand that various changes in form and detail may be made without departing from the true spirit and full scope of the disclosure as set forth, for example, in the appended claims and equivalents thereto.

What is claimed is:

1. An electronic device comprising:
   a display;
   a memory;
   a communication module comprising communication circuitry; and
   a processor,
   wherein the processor is configured to:
   receive a second image corresponding to a first image stored in the memory from an external electronic device through the communication module, the second image being an image in which a raw image corresponding to the first image is corrected,
   identify information associated with at least one stat used by the external electronic device to correct the second image,
   identify an amount of change of the at least one stat of a first plurality of images including the first image stored in the memory and a second plurality of images including the second image corresponding to the first plurality of images received from the external electronic device,
   select the first image having a highest amount of change of the stat with the second plurality of images from among the first plurality of images,
   control the display to display the first image on a first segment of the display and to display the second image on a second segment of the display, and
   identify whether to store the second image in the memory, based on an input for the first image or the second image.

2. The electronic device of claim 1, wherein the processor is further configured to:
   delete the second image based on the first image being selected based on the input, and
   delete the first image based on the second image being selected based on the input.

3. The electronic device of claim 1, wherein the processor is further configured to control the display to display at least one image from among the first plurality of images in which the amount of change of the stat with the second plurality of images satisfies a designated condition.

4. The electronic device of claim 1, wherein the processor is further configured to:
   classify the first image into a plurality of segments,
   identify an amount of change of the at least one stat between the first image and the second image for each of the plurality of segments in the first image and corresponding plurality of segments in the second image,
   select at least one segment from the plurality of segments based on the amount of change of the at least one stat, and
   control the display to display the at least one selected segment of the first image on the first segment and display the corresponding at least one selected segment of the second image on the second segment.

5. The electronic device of claim 1, wherein
   the memory is configured to store the first plurality of images including the first image and the external electronic device is configured to store a plurality of raw images corresponding to each of the first plurality of images, and
   the processor is configured to control the electronic device to receive the second plurality of images including the second image in which a selected at least one raw image is corrected based on at least one raw image being selected from among the plurality of raw images based on the information associated with the at least one stat used by the external electronic device to correct the second image, using the communication module.

6. The electronic device of claim 1, wherein the processor is configured to display a notification indicating reception of the second image based on the reception of the second image, to display the first image on the first segment of the display based on an input for the notification, and to display the second image on the second segment of the display.

7. The electronic device of claim 1, wherein the processor is configured to:
   receive the second plurality of images including the second image, corresponding to some images of the first plurality of images including the first image via the communication module, and
   display the second plurality of images separately from the remaining images except for some images of the first plurality of images.

8. A method of controlling an electronic device, the method comprising:
- receiving, from an external electronic device, a second image in which a raw image corresponding to a first image stored in a memory is corrected, the second image corresponding to the first image;
- identifying information associated with at least one stat used by the external electronic device to correct the second image;
- identifying an amount of change of the at least one stat of a first plurality of images including the first image stored in the memory and a second plurality of images including the second image corresponding to the first plurality of images received from the external electronic device;
- selecting the first image having a highest amount of change of the stat with the second plurality of images from among the first plurality of images;
- displaying the first image on a first segment of a display and displaying the second image on a second segment of the display; and
- identifying whether to store the second image in the memory based on an input for the first image or the second image.

9. The method of claim 8, further comprising:
- deleting the second image based on the first image being selected based on the input; and
- deleting the first image based on the second image being selected based on the input.

10. The method of claim 8, further comprising:
- displaying at least one image from among the first plurality of images in which the amount of change of the stat with the second plurality of images satisfies a designated condition.

11. The method of claim 8, further comprising:
- classifying the first image into a plurality of segments;
- identifying an amount of change of the at least one stat between the first image and the second image for each of the plurality of segments in the first image and corresponding plurality of segments in the second image;
- selecting at least one segment from the plurality of segments based on the amount of change of the at least one stat; and
- displaying the at least one selected segment of the first image on the first segment and displaying the corresponding at least one selected segment of the second image on the second segment.

12. The method of claim 8, further comprising:
- storing the first plurality of images including the first image and storing, by the external electronic device, a plurality of raw images corresponding to each of the first plurality of images; and
- receiving the second plurality of images including the second image in which a selected at least one raw image is corrected based on at least one raw image being selected among the plurality of raw images based on the information associated with the at least one stat used by the external electronic device to correct the second image.

13. The method of claim 8, further comprising:
- displaying a notification indicating reception of the second image based on the reception of the second image, displaying the first image on the first segment of the display based on an input for the notification, and displaying the second image on the second segment of the display.

14. The method of claim 8, further comprising:
- receiving the second plurality of images including the second image, corresponding to some images of the first plurality of images including the first image via a communication module; and
- displaying the second plurality of images separately from the remaining images except for some images of the first plurality of images.

15. An electronic device comprising:
- a communication module comprising communication circuitry;
- an image signal processing processor; and
- a processor,
- wherein the processor is configured to:
- receive, from an external electronic device, a plurality of raw images corresponding a first plurality of images included in a memory of the external electronic device using the communication module,
- identify information associated with at least one stat of the plurality of raw images corresponding to the image signal processing processor,
- select at least one raw image of the plurality of raw images using the information associated with the at least one stat,
- obtain a second plurality of images by correcting the plurality of raw images including the at least one raw image,
- select a raw image having a highest amount of change of the at least one stat between the plurality of raw images and the second plurality of images from among the plurality of raw images, and
- transmit the second image in which the raw image having the highest amount of change of the at least one stat is corrected to the external electronic device.

* * * * *